May 11, 1954   M. SCHWARTZ ET AL   2,677,998
LIGHT BEAM PROJECTING RANGE FINDER
Filed Jan. 14, 1953   2 Sheets-Sheet 1

INVENTORS
MORRIS SCHWARTZ
WILLIAM CASTEDELLO
BY
Frederick E. Hane
ATTORNEY

May 11, 1954  M. SCHWARTZ ET AL  2,677,998
LIGHT BEAM PROJECTING RANGE FINDER
Filed Jan. 14, 1953  2 Sheets-Sheet 2
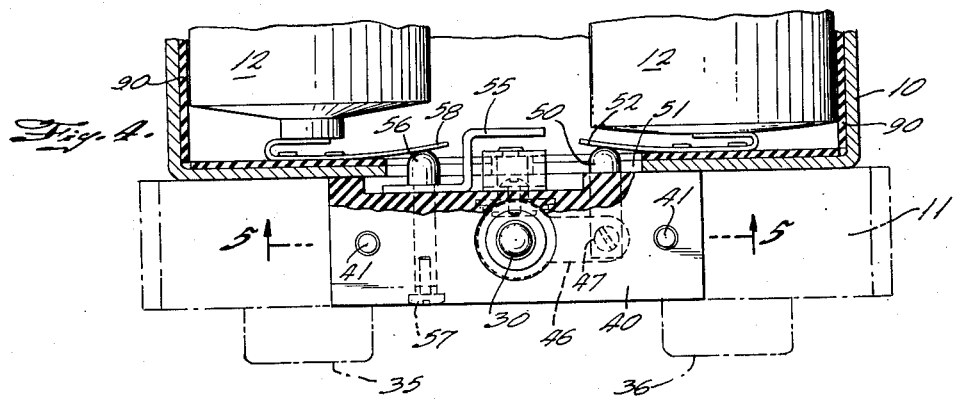
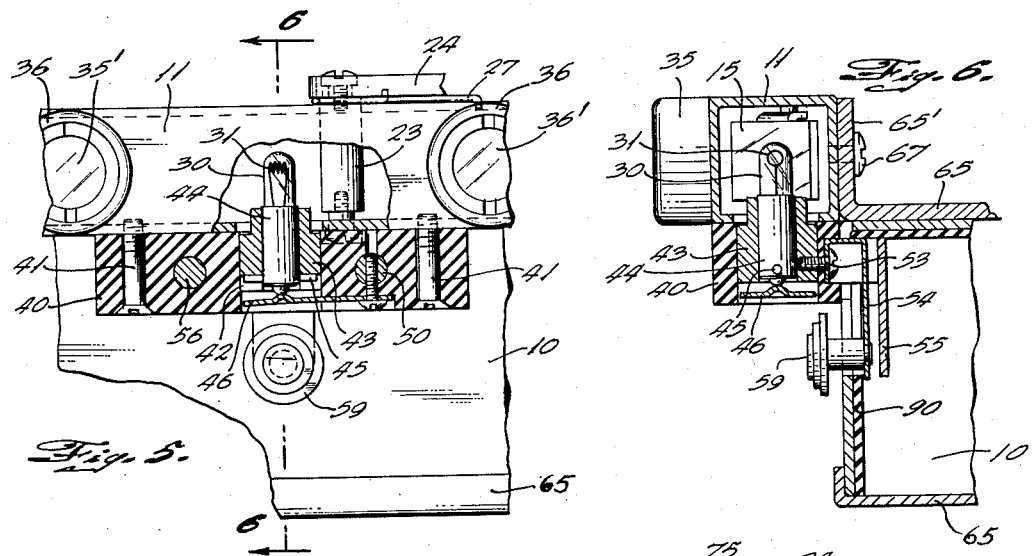
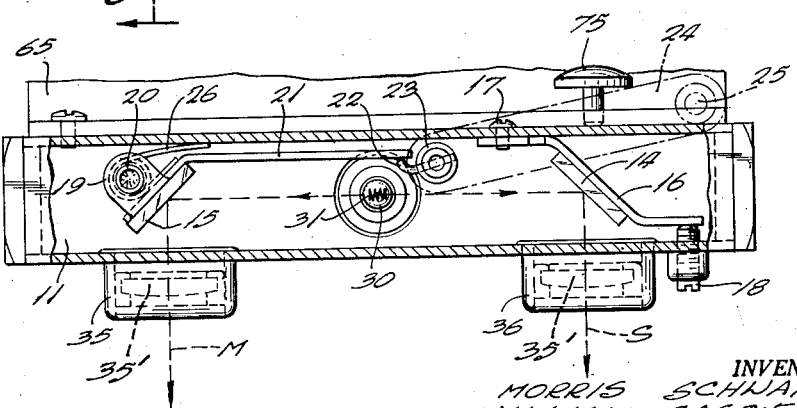
INVENTORS
MORRIS SCHWARTZ
WILLIAM CASTEDELLO Patented May 11, 1954

2,677,998

UNITED STATES PATENT OFFICE 2,677,998

LIGHT BEAM PROJECTING RANGE FINDER

Morris Schwartz and William Castedello, Plainville, Conn., assignors to The Kalart Company Inc., Plainville, Conn.

Application January 14, 1953, Serial No. 331,192

13 Claims. (Cl. 95—44)

This invention relates to a light beam projecting photographic range finder, particularly to a range finder of this type which is attachable as an accessory to the casing of a camera.

There are already known several designs of a light beam projecting range finder attachable to a camera with a drop bed and a bellows between the objective carrier and the camera casing. However, there is not as yet available a light beam projecting range finder that is suitable for cameras of the type in which the objective carrier forms the front wall of the camera casing and is movable relative thereto by means of a focusing knob, in particular for reflex cameras.

One of the principal objects of the present invention is to provide a light beam projecting photographic range finder which can be conveniently attached to a casing of the camera of the general type, above referred to, particularly to a reflex camera, for instance, of the twin-lens reflex type such as the Rolleiflex.

According to the invention, a light beam projecting range finder suitable for cameras in which the objective carrier forms the front wall of the camera casing and is movable relative thereto by means of a focusing knob is attained by disposing the source of current for the range finder within a casing which is provided with holding means for detachably securing the finder casing of the bottom of the camera casing in a predetermined position relative thereto; by disposing the optical system of the range finder and the moving mechanism for adjusting the optical system in accordance with the range to be determined within a second casing fixedly mounted on the first mentioned casing in a position providing for an unimpeded focusing movement of the objective carrier, and by providing an actuating member forming part of the moving mechanism and extending into the path of the objective carrier movement for actuation by the said movement, thereby adjusting the range finder in conformity with the focusing of the camera.

According to a further improvement of the invention, the outline of the casing housing the source of current matches substantially the outline of the bottom of the camera casing, and the second casing housing the optical system and the moving mechanism is disposed in a position in which the center axis between the beam projecting windows of the range finder is parallel to the bottom of the camera casing.

A switch for closing a circuit for the light bulb of the range finder is preferably mounted in one of the side walls of the casing housing the source of current.

The entire range finder is preferably attachable to the camera casing by means of a screw fitting the tripod hole of the camera casing, and a flash bulb holder can be attached to the range finder by means of a bracket fastened to the casing of the range finder housing the source of current.

For the purpose of attaching the range finder to the camera casing in the proper position for adjusting the optical system of the finder in accordance with the focusing position of the objective carrier, guide posts protrude from the top wall of the casing housing the source of current which posts are engageable with legs extending from the bottom of the camera casing. At least one of the guide posts and the legs in engagement with each other are complementarily shaped so as to extend one into the other thereby fixing the position of the range finder relative to the camera casing.

The moving mechanism of the range finder includes a pin-like member engageable with the objective carrier and supported on a pivotal lever. This lever is coupled with the pivotal reflector of the range finder so that a displacement of the objective carrier causing a pivotal movement of said lever by means of the pin will effect a corresponding angular adjustment of the pivotal reflector.

In the accompanying drawing a now preferred embodiment of the invention is shown by way of illustration and not by way of limitation.

In the drawing:

Fig. 4 is a fragmentary plan view of the range finder assembly, partly in section.

Fig. 5 is a section taken on line 5—5 of Fig. 4.

Fig. 6 is a section taken on line 6—6 of Fig. 5 and

Fig. 7 is a longitudinal sectional view of the optical system and the moving mechanism of the range finder.

As is well known to persons skilled in the art, light beam projecting range finders of the type, herein referred to, comprise a stationary reflector, such as a mirror, and a pivotal reflector, such as a mirror, which are disposed one with the other and with a source of light, such as an incandescent light bulb, in an optical relationship so that two light beams are projected by the two reflectors. The beam emanating from the stationary reflector has a fixed angular position, whereas the angular position of the beam emanating from the pivotal reflector is controlled by the position of this latter reflector. The beams produce two light spots on the object, the range of which is to be determined. The pivotal reflector is coupled by a moving mechanism with the objective carrier of the camera so that the angular position of the pivotal reflector is controlled by the focusing position of the said carrier. It will now be apparent that an adjustment of the objective carrier will vary the relative position of the light spots. The ratio of transmission of the moving mechanism is so arranged that the camera is correctly focused when the two light spots are in a predetermined relative position, for instance in a superimposed position.

Figure 3:
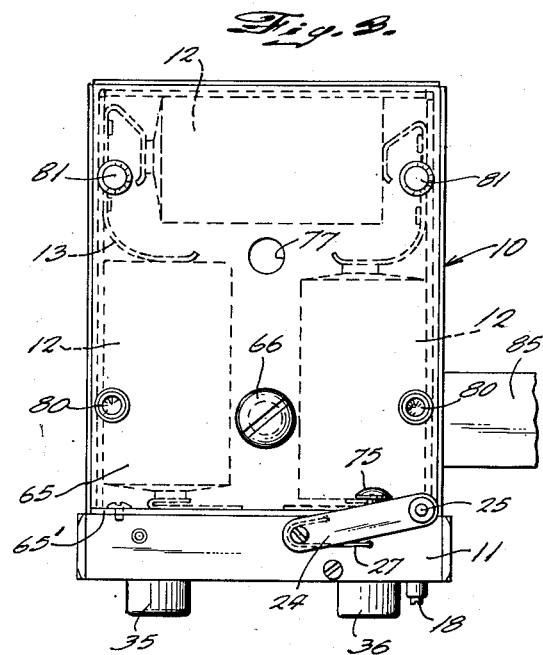
Fig. 3 is a plan view of the range finder assembly.

Referring now to the figures in detail, the range finder assembly comprises a substantially rectangular large casing 10 and a smaller casing 11 secured to casing 10. Casing 10 houses one or more batteries 12 as source of current for the light bulb of the range finder. The batteries are connected in series by suitable spring contacts 13, as can best be seen on Fig. 3. The optical system of the range finder is disposed within casing 11 which also houses or supports the moving mechanism of the range finder. As was previously explained and can best be seen on Fig. 7, the optical system of the range finder comprises a stationary mirror 14, a pivotal mirror 15 and lenses 35', 36' fitted in windows 35, 36. Mirror 14 is secured, for instance by cementing, to a bracket 16 one end of which is screwed to a wall of housing 11 by means of a screw 17. The free end of the bracket is engaged by a set screw 18 for the purpose of adjusting the position of mirror 14 within certain narrow limits. Mirror 15 is cemented to a mounting 19 pivotally supported by a pin 20. An arm 21 extends from mounting 19 and is engaged at its free end by a short, preferably curved lever 22 secured to a pivot 23. As can best be seen on Fig. 5, this pivot is pivotally extended through casing 11 and supports at its end protruding from the top wall of casing 11 a lever 24. This lever has on its free end a pin 25 the function of which will be more fully explained hereinafter. It suffices to say at the present time that a pivotal movement of lever 24 will cause a corresponding pivotal movement of mirror 15. Springs 26 and 27 serve to hold the hereinbefore described movement transmitting components in engagement.

The source of light of the range finder is shown as a small bulb 30, the filament 31 of which is in the form of a coil disposed in axial alignment with the optical center axis between mirrors 14 and 15. Bulb 30 and mirrors 14 and 15 cause the projection of two light beams through lenses 35' and 36'. Light beam S is stationary and the light beam M is movable relative to the beam S. By reason of the coil shape of filament 31, the light spots produced by the two beams take the form of small rings which has the advantage that the two light spots can be conveniently placed in an accurate super-imposed position. The two light beams are projected from casing 11 through the lenses in the windows 35 and 36 which are of conventional design.

Bulb 30 is mounted by means of a substantially rectangular insulation block 40 secured to casing 11 by screws 41. Block 40 is provided with a bore 42 in which is fitted a metal sleeve 43 receiving a socket 44 for the base of bulb 30. The lower face of sleeve 43 is provided with a groove engaged by pins 45 extending from socket 44 for the purpose of fixing the bulb in a position in which its coil filament is aligned with the optical axis between the two mirrors. The bulb is held in sleeve 43 by means of a springy metal plate 46 secured to insulation block 40 by means of a screw 47. Plate 46 engages the bottom terminal of bulb 30 as can best be seen on Figs. 5 and 6.

For the purpose of connecting the bottom terminal of the bulb to the batteries, a contact plug 50 is fitted in insulation block 40. Plug 50 is in electric contact with screw 47 and engages with its end extending into casing 10 through an opening 51 in the front wall of this casing a contact spring 52 abutting against one of the terminals of the battery 12 shown on the right side of Fig. 4. Socket 44 is engaged by a screw 53 which supports a flexible contact strip 54. The screw forms one contact element of a switch, the other contact element of the switch being formed by a contact strip 55 the shape of which can best be seen on Fig. 4. Contact strip 55 is in electric contact with a contact plug 56 fitted in a bore of insulation block 40 by means of a screw 57. Plug 56 engages a contact spring 58 which in turn abuts against a terminal of the battery 12 shown on the left side of Fig. 4. Contact elements 54 and 55 are biased into a disengaged position (as shown on Fig. 6). A switch button 59 secured to contact element 54 serves to establish connection between contact elements 54 and 55 by pressing button 59 toward casing 10. The switch is preferably mounted in the front side wall of casing 10. As will now be apparent, actuation of button 59 will close a circuit for bulb 30.

The top side of casing 10 is closed by a cover plate 65 which may be secured to the casing by means of screws 66. The front edge of plate 65 is bent upwardly to form a bracket 65' to which casing 11 is secured by means of screws 67.

An insulation lining 90 is provided within the casing to insulate the batteries from the casing and the cover and is secured to the cover by screws 91.

Figure 1:
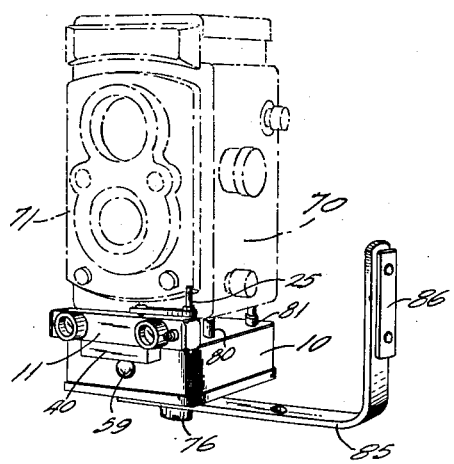
Fig. 1 is a perspective view of a light beam projecting range finder assembly according to the invention attached to a reflex camera, the camera being shown in phantom.
Figure 2:
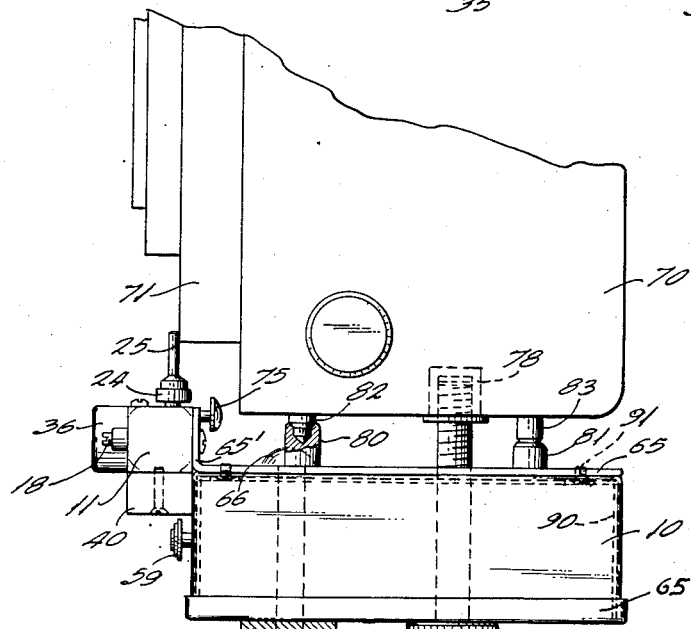
Fig. 2 is a side view of the range finder assembly attached to the camera casing.

The outline of casing 10 corresponds preferably approximately to the bottom of the casing of a camera 70 in conjunction with which it is intended to use the range finder. The camera is shown as a reflex camera, the objective carrier 71 of which forms the front wall of the camera casing. As is conventional with cameras of this type, operation of the focusing knob of the camera moves the objective carrier back and forth relative to the casing proper. As can best be seen on Figs. 1 and 2, casing 11 is so arranged that it is in front of the camera casing but does not impede the focusing movements of the objective carrier. The longitudinal axis of casing 11 is parallel to the plane of the bottom of the camera casing, and the two beam windows of the finder are equidistant from the center of the camera objective to facilitate aiming of the camera.

The aforementioned pin 25 engages the objective carrier 71. As a result, the pivotal position of lever 24 and, hence, of mirror 15 will be controlled by the focusing position of the objective carrier 71. A headed screw 75 serves to limit the follower movement of lever 24 when objective carrier 71 is in a retracted position.

The entire range finder assembly is detachably secured to the bottom of the camera casing by any suitable means such as a screw 76 which is extended through holes 77 in casing 10 and threaded into the tripod hole 78 of the camera.

As will be apparent from the previous description, it is essential that the range finder assembly is always secured to the camera casing in a definite position since a variation of this position would upset the range adjustment of the finder. For the purpose of facilitating mounting of the range finder in the said definite position, two pairs of legs or guide posts 80 and 81 extend from cover 65 of casing 10. These legs engage corresponding pairs of legs 82 and 83 extending from the bottom of the camera casing. As can best be seen on Fig. 2, legs 81 and 83 have flat engaging faces while legs 80 and 82 are recessed and tapered respectively so that the legs 80 and 82 engage each other thereby fixing the range finder in its position relative to the camera casing. Instead of providing engaging front legs it is, of course, also possible to provide engaging rear legs. Furthermore, all four pairs of legs may engage each other or diagonal pairs of legs may be in engagement.

One of the screws 66 can also be used to support a bracket 85 for a flash bulb holder of conventional design which may be slipped upon a shoe 86 of the bracket. Screw 76 is preferably provided with a threaded bore 92 to receive the tripod screw.

What is claimed to be new, is:

1. A light beam projecting photographic range finder attachable to a photographic camera having a casing the front wall of which forms the objective carrier of the camera and is movable by means of the focusing knob of the camera, the said range finder comprising a first closed casing for a source of current for the range finder, fastening means on the casing for detachably securing the same to the bottom of a camera casing in a predetermined position relative thereto, a second closed casing fixedly mounted on the first casing in a position providing for an unimpeded movement of the objective carrier, an optical system for projecting two light beams angularly movable relative to each other, and a moving mechanism for adjusting the relative angular position of the two beams disposed within said second casing, the said moving mechanism including an actuating means protruding from said second casing into the path of the objective carrier movement and engageable with said objective carrier for transmitting the focusing movement of the objective carrier to said moving mechanism thereby adjusting the latter in conformity with said focusing movement.

2. A range finder according to claim 1, wherein the peripheral outline of said first casing is substantially rectangular and matches substantially the peripheral outline of the bottom portion of a camera casing to which it is attachable, and wherein the said optical system comprises two lens means mounted in a wall member of the second casing spaced apart in a position in which the center axis between the two lens means is situated parallel to the plane of the bottom of a camera casing to which the range finder is attached.

3. A range finder according to claim 2, wherein the said second casing has a substantially rectangular peripheral outline, and wherein the said two lens means are positioned equidistant from the optical center axis of the camera objective.

4. A range finder according to claim 1, wherein the second casing is secured to one of the side edges of the top wall of said first casing parallel to said edge.

5. A range finder according to claim 4, wherein the said top wall is formed with a flange protruding therefrom, the said flange constituting a support for said second casing.

6. A range finder according to claim 1, wherein the said optical system includes a light bulb connectable in circuit with a source of current disposed in said first casing, and wherein a switch means is included in said circuit for illuminating said light bulb by closing of the switch means.

7. A range finder according to claim 6, wherein the said switch means is mounted adjacent to one of the walls of said first casing.

8. A range finder according to claim 1, in combination with a bracket for a flash bulb holder attachable to said first casing.

9. A range finder according to claim 1, wherein the said first casing has a transverse hole therethrough, and wherein a screw is fitted through said hole retained therein, the said screw being adapted to be threaded into the tripod hole of a camera casing.

10. A range finder according to claim 1, wherein the said fastening means comprise guide posts upwardly protruding from the top wall of the first casing, the said guide posts being engageable with legs extending from the bottom of the camera casing, at least two guide posts and two legs in engagement with each other being complementarily shaped so as to extend one into the other thereby fixing the position of the range finder relative to the camera.

11. A range finder according to claim 1, wherein the said optical system includes a stationary light deviating means, a pivotal light deviating means and a light bulb disposed in the optical center axis between said two light deviating means for causing the same to project the said two light beams, a lever pivotally mounted on the outside of said second casing and operatively connected with said pivotal light deviating means for pivotal movement in unison therewith, and a pin extending from said pivotal lever and engageable with said objective carrier for moving the pivotal light deviating means into an angular position corresponding to the focusing position of the objective carrier.

12. A range finder according to claim 11, wherein the said connection between the pivotal light deviating means and the pivotal lever comprises an arm extending from said pivotal light deviating means and disposed within the second casing, a pivot rotatably extending through the top wall of said second casing, the end of said pivot within the second casing engaging said arm and the end of the said pivot outside the casing being secured to said pivotal lever, and loaded spring means biasing said arm and said lever into a movement transmitting engagement.

13. A range finder according to claim 11, wherein an insulation block including a bore is secured to a wall of said second casing on the outside thereof, the said light bulb being fitted in said bore so as to extend into the interior of said second casing and in the axis between the two light deviating means, and wherein a metal plate releasably attached to said insulation block retains said bulb in said bore, the said metal plate engaging one of the terminals of the bulb and connecting the said terminal with a source of current in said first casing, the other terminal of the bulb being connectable to the source of current.

No references cited.